United States Patent Office 3,252,959
Patented May 24, 1966

3,252,959
PROCESS FOR THE PREPARATION OF A SUPPORTED CATALYST FOR THE STEREOSPECIFIC POLYMERIZATION OF ALPHA-OLEFINS IN VAPOR PHASE
Giorgio Moretti and Vincenzo D'Alessandro, Ferrara, Italy, assignors to Montecatini Società Generale per l'Industria Mineraria e Chimica, Milan, Italy, a corporation of Italy
No Drawing. Filed Dec. 26, 1961, Ser. No. 162,635
Claims priority, application Italy, Dec. 29, 1960, 22,218/60
24 Claims. (Cl. 260—93.7)

The invention relates to an improved process for the preparation of a supported catalyst, consisting of at least two components, which is suitable for use in the stereospecific polymerization of alpha-olefins in the vapor phase.

The preparation of alpha-olefin polymers using catalysts possessing a high stereospecific activity, such as halides of transition metals of the IV, V, VI or VIII groups of the Mendeléeff Periodic Table, the valence of said metal being lower than its highest, used in conjunction with an organo-metallic compound of a metal of groups II or III, is known in the polymer art as evidenced by numerous patents and publications.

The transition metal halides described above are generally solid and crystalline products that are normally obtained by reducing the more readily available corresponding halides wherein the metal is in its highest valence state. The reduction methods employed, both those conducted in the vapor phase at elevated temperatures in the presence of hydrogen, and those carried out at lower temperatures using organo-metallic compounds, metallic hydrides or metals, are also well known in the art.

Thus, it is known to use as a reducing agent a very finely divided aluminum powder of the type used for varnishes. The aluminum powder employed is generally washed and purified prior to pulverization. The reduction of TiCl$_4$ with aluminum in the presence of an aluminum halide, such as, for example, aluminum chloride, is known. This reaction occurs in the presence of an inert diluent, such as a liquid hydrocarbon.

The reduction using aluminum can be illustrated, for example, as follows:

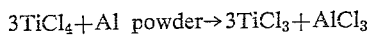

$$3TiCl_4 + Al \text{ powder} \rightarrow 3TiCl_3 + AlCl_3$$

The shortcomings of said catalyst relate essentially to the difficulties encountered in separating and purifying the solid part of the reaction product and the tendency of the catalyst to be easily swept away when employed in vapor phase polymerization processes, particularly when using fluidized bed technique. These shortcomings are caused essentially by the very fine form of the catalyst particles.

It is also known to permanently support the reduction product of a transition metal halide on a preformed granulated support, which, thereby, permits the use of higher velocities in a fluidized bed reactor, since the sweeping away of the catalyst is substantially eliminated. The reduction method used, consists, generally, in reducing a halide of a metal present at its highest valence state, e.g., titanium tetrachloride, which is impregnated on a granulated polymer. The reduction is conducted using an organo-metallic compound which is also impregnated on the same type of support. The two components react when the two supports containing the different impregnated materials, are mixed together and heated at the reaction temperature.

The supported reduction product can be used as one of the catalytic components in both liquid and vapor phase polymerization processes.

Supports other than a granulated polymer are also used, such as water soluble inorganic compounds, for example, CaCl$_2$, Na$_2$CO$_3$, MgCl$_2$, Ca$_3$(PO$_4$)$_2$, NaCl, etc.

When the reduction techniques with aluminum metal, as above described is applied to the preparation of supported catalysts, by operating in the presence of granular inert solids, it has been found that most of the TiCl$_3$ formed in the reduction step is obtained in a finely divided form which is completely unsupported.

It is therefore an object of the present invention to provide a process for the preparation of a reduced and supported catalyst containing a transition metal halide at a valency lower than the maximum which is firmly connected to the support. The supported catalyst is obtained by the reduction of the maximum valence transition metal halide with aluminum metal.

Another object is to provide such a catalyst, by carrying out the reaction in absence of a diluent.

A further object is to provide a polymerization process wherein the catalyst component obtained from the reduction of TiCl$_4$ is supported entirely on a granular support made of an inorganic compound that is water soluble or soluble in a washing solution of the polymer like ketones, glycols, alcohols and water solutions of the same, said inorganic compound being inert to the catalyst components and has a melting point higher than the preparation or polymerization temperature.

A further embodiment of the invention is the production of polymers of alpha-olefines obtained using the supported catalyst of the present invention.

Other objects and a fuller understanding of the present invention may be had by referring to the following description and claims.

It has been found that by operating in presence of a liquid phase, the aluminum particles loosen themselves from the support, and the titanium trichloride is not adsorbed quantitatively on the support. It has also been found that in order to prevent the formation of a liquid phase, which favors the production of non-supported titanium trichloride, the amount of transition metal halide such as titanium tetrachloride to be used is critical.

The amount of TiCl$_4$ to be added to the mix containing a support and aluminum powder is in excess of the amount required to react with Al (atomic ratio Ti/Al=3, corresponding to formation of AlCl$_3$), but may not exceed the amount capable of being completely adsorbed on the support. The solid granulated product which is thus obtained has a uniform red-violet shade.

The reduction temperatures are desirably between 100° and 400° C., preferably between 200° and 300° C. No inert diluent is used in the process.

The ratios by weight of the maximum valence transition metal halide to aluminum will depend of course on the particular materials employed. However, such suitable ratios may be from 21:1 to 200:1, preferably from 40:1 to 100:1.

The reduction product of titanium tetrachloride obtained is firmly supported on the granulated support, and this can be demonstrated by the following: The supported product is stirred with heptane in a large test tube (diameter=40 mm., h=500 mm.), and then allowed to settle. Sedimentation takes place very rapidly, practically at the same speed as that of the support alone. The amount of reduction product that settles at a slower rate, due to the fact it has not anchored as yet to the support, is extremely small.

Upon using a mix containing a support material and a titanium trichloride obtained by a different method, a rapid sedimentation of the support occurs (in a few seconds); while the sedimentation of the unsupported titanium trichloride proceeds slowly, taking 3 to 15 minutes or more, depending on its degree of fineness.

The reduction of the present invention may be carried out in the following manner: A mix containing a suitable support and aluminum powder impregnated with titanium tetrachloride is inserted in a rotary reactor made of a pressure-resistant horizontally positioned pipe that is flanged on the ends, and is resting on supports. The reactor is heated with a Bunsen burner. A rotary motion imparts a uniform temperature throughout the reactor.

Another method of carrying out the reduction comprises inserting a mix comprising a support material and aluminum powder in a heated and vertically positioned reactor, and feeding titanium tetrachloride in the vapor phase throughout the mix. When the reaction is completed, the excess titanium tetrachloride is removed from the reaction product by heating under vacuum and/or by washing with an inert solvent, such as heptane.

The reduction product of the supported titanium tetrachloride obtained, as hereinbefore described, is one of the two components, of the polymerization catalyst. The other component, an organometallic compound of a metal of the II and III groups of the Mendeléeff Periodic Table, may be added using various techniques. As metalorganic compound an aluminum trialkyl, aluminum dialkyl monohalide or monoalkyl dihalide, a zinc dialkyl, a beryllium dialkyl etc. may be used.

It is possible, for example, to operate in the vapor phase using a fluidized bed reactor wherein the heat of reaction is removed by the jet of vaporized olefins that passes through the mix containing the catalyst and the polymer being formed. The organometallic compound may be fed into the reactor in vapor phase by bubbling the vaporized olefin through it, or through its solution in a hydrocarbon liquid. This polymerizable vaporized olefin is then fed into the bottom of the reactor, while the reduction product of titanium tetrachloride, which is supported on a suitable support, is introduced separately by means of a metering device.

Another method comprises adsorbing an organometallic compound on a support which may be the same as or different from the support material used in the adsorption of the reduced $TiCl_4$, provided that the support is an inert material, for example, granulated polypropylene. The two supports may be introduced into the reactor separately or mixed together.

This second technique is advantageous especially when the polymerization is carried out using a batch operation in vapor phase, wherein there is no recycle of the vaporized olefins. The olefin is fed continuously in the same amount as it is used up in the polymerization, and the bulk material comprising the polymer, being formed and the supported catalyst is stirred with a suitable stirrer.

The inorganic support is removed when the polymerization is completed, in a relatively simple manner by treating the polymer with solutions such as aqueous-alcoholic acid solutions. The catalyst residue that is adsorbed on the inorganic support is also attached and thus easily removed, so that washing the polymer is easily accomplished.

Another embodiment of the present invention comprises providing a process for the vapor-phase stereospecific polymerization of alpha-olefins, especially propylene, in presence of a catalyst comprising a member selected from organic-metallic compounds of metals of the II and III groups of the Mendeléeff Periodic Table, particularly aluminum, zinc or beryllium, in conjunction with a supported halide of a transition metal of the IV, V, VI, or VIII groups of said Periodic Table which is prepared as above described.

The supported catalysts of the present invention are especially suitable for use in the homopolymerization and copolymerization of alpha-olefins of the formula $R-CH=CH_2$, wherein R is a hydrocarbon radical such as alkyl, cycloalkyl or aryl. Thus, alpha-olefins such as pyropylene, butene-1, pentene-1, hexene-1, styrene and the like or monomeric mixtures containing these olefins can be advantageously polymerized using the instant catalysts.

The preferred organometallic compounds are aluminum alkyls, aluminum alkylhalides, beryllium alkyls, beryllium alkyl halides, etc. while the preferred transition metal halides are titanium chlorides and vanadium chlorides.

The molar ratio of organometallic compound to reduced transition metal halide used in the catalytic system is from 1:1 to 10:1, preferably from 2:1 to 7:1.

The alpha-olefin polymers prepared using the catalysts of the present invention, in general, possess a grandular, non-powdered, appearance, and high bulk density.

The present invention is illustrated by the following examples. It is to be understood that these examples are merely illustrative and indicate no intention to thereby limit the scope of the present invention in any manner.

Unless otherwise indicated, all parts are by weight.

Example 1

0.6 g. of aluminum powder (varnish grade, previously washed under heat with toluene and dried using inert gas) are dispersed on 120 g. of granulated calcium chloride (previously dried by heating under vacuum) whose mean diameter is from 1 to 1.5 mm.

The mix is completely homogenized and then charged into a 400-cc., horizontally positioned, rotary autoclave consisting of a 40 mm.-diameter pipe that is flanged on the ends and provided with an inlet valve, pressure gauge and thermometer. Vacuum is applied, and 25 cc. of titanium tetrachloride are sucked into the reactor. The autoclave is rotated at 32 r.p.m. and heated up to 170° C. using a Bunsen burner.

The temperature increases rapidly, and a temperature of 270° C. is attained in a few minutes. This tamparature is maintained, while rotating for three hours. Then the bulk is discharged, washed a few times with heptane, and dried by heating up to 150° C. under vacuum. The granules are colored a red-dark violet shade, and some powder is present.

A screen test is made in a nitrogen atmosphere, and two sizes of supported catalyst are collected. The material, oversize from the screen, about 124 g., contains 2.6% of titanium trichloride, while in the fines on the bottom (2 g.) is present 38% of titanium trichloride, 81% of the prepared titanium trichloride is supported on the granules of calcium chloride.

The reduction product is firmly supported on the granules of calcium chloride since upon stirring this supported product with heptane and allowing it to settle in a graduate ($d.=40$ mm., $h.=500$ mm.), a rapid and complete sedimentation occurs with no powder formation. 23 g. of this supported product containing 0.6 g. of titanium trichloride are intimately mixed with 25 g. of polypropylene in granular form whose mean diameter is from 1 to 1.5 mm. on which are adsorbed 2.65 g. of aluminum triethyl. The mix is transferred into a 2-liter vertical autoclave provided with gauge, thermometer, an inlet valve for feeding propylene and a stirrer with blades for scraping the autoclave bottom. The autoclave is kept in an oil bath thermostat. Propylene is added, and a polymerization carried out for seven hours at 75° C. while maintain a constant pressure of 5 atmospheres. After cooling, 310 g. of a product having a granular appearance are discharged.

This corresponds to 260 g. of polymer alone, i.e., not counting the inorganic support and the polymer added at the beginning of the polymerization.

The product is washed with an aqueous-methanol solution (1:1) and acidified with HCl to remove the calcium chloride. After drying, the product, which is practically pure of calcium chloride, has the following characteristics:

[$\eta$] (determined in tetralin at 135° C.)=2.3;

Residue upon extraction with boiling heptane=84.5%;
Flexural rigidity=8700 kg./cm.$^2$.

Example 2

113 g. of a completely dry calcium chloride, in the form of small granules (which passed through 100 mesh/cm.$^2$ screen) and the oversize from a 400 mesh/cm.$^2$ screen, on which are deposited 0.61 g. of the aluminum powder, as described in Example 1, are introduced into a rotary autoclave in the same manner as described in Example 1. 25 cc. of titanium tetrachloride are then introduced. The autoclave is heated up to 250° C. (the temperature increase is rapid above 170° C.). The temperature is then maintained at 250° C. for ten hours. The bulk product is discharged and treated as described in Example 1.

A screen test is made in nitrogen atmosphere, and two sizes of granules are collected, a granular portion consisting of about 118 g. of granules containing 4.3% of titanium trichloride, which are colored a red-violet shade, and 1 g. of a powdered portion containing 40% of titanium trichloride.

93% of the prepared titanium trichloride is supported on the granules of calcium chloride. The reduction product is firmly supported on the granules of calcium chloride, as shown by the settling test, as described in Example 1.

13.8 g. of this product, containing 0.6 g. of titanium trichloride, are intimately mixed with 25 g. of polypropylene granules on which are adsorbed 2.65 g. of aluminum triethyl. This mix is transferred into a 2-liter autoclave, and the polymerization of propylene is carried out for seven hours at 75° C. and at 5 atmospheres. 225 g. of polymer are obtained, not including starting support material. After washing with water and methanol, and drying, the product has the following characteristics:

[$\eta$] (determined in tetralin at 135° C.)=2.5;
Residue after extraction with boiling heptane=86%;
Flexural rigidity=9300 kg./cm.$^2$.

Example 3

120 g. of completely dry calcium chloride in the form of small granules (which passed through a 100 mesh/cm.$^2$ screen and the oversize from a 400 mesh/cm.$^2$ screen), on which are deposited 0.6 g. of aluminum powder, are introduced into a rotary autoclave, in the same manner as described in Example 1. 25 cc. of titanium tetrachloride are then introduced. The autoclave is heated slowly up to 200° C., and is rotated at this temperature for 25 hours. The product is then discharged and treated as described in Example 1.

A screen test is made in a nitrogen atmosphere and two sizes of product are collected; a granular portion consisting of 122 g. of granules that are red-violet in color and contain 2.86% of titanium trichloride, and 5 g. of a powdered portion containing 13% of titanium trichloride. 84% of the prepared titanium trichloride is supported on the granules of calcium chloride, and does not loosen therefrom upon stirring with heptane.

21 g. of the above product, containing 0.6 g. of titanium trichloride, are intimately mixed with 25 g. of polypropylene granules on which are adsorbed 2.65 g. of aluminum triethyl. This mix is transferred into a 2-liter autoclave, and a polymerization of propylene is carried out for seven hours at 75° C. and at 5 atmospheres, by operating in the same manner as described in Example 1. 275 g. of polymer are obtained, not including the starting supports. After washing with water and methanol, and drying the polymer has the following characteristics:

[$\eta$] (determined in tetralin at 135° C.)=2.5;
Residues after extraction with boiling heptane=86%;
Flexural rigidity=9150 kg./cm.$^2$.

Example 4

117 g. of completely dry calcium chloride in the form of small granules (which passed through a 100 mesh/cm.$^2$ screen and the oversize from a 400 mesh/cm.$^2$ screen), on which are deposited 0.53 g. of aluminum powder, are introduced into a 400 cc. vertically positioned stainless steel autoclave (diameter=about 40 mm.) which has an inlet valve installed on the top. The autoclave is further provided with a pressure gauge and a thermometer, and is heated with an electric heater. Vacuum is applied and 25 cc. of titanium tetrachloride are sucked into the autoclave. The autoclave is heated to 250° C. for four hours. The bulk product is then discharged and treated as described in Example 1.

A screen test is made as hereinbefore described, and two sizes of granules are collected, a granulated portion consisting of 119 g. of granules containing 2.4% of titanium trichloride, and 2.3 g. of a powdered portion, containing 34% of titanium trichloride. 78% of titanium trichloride is supported on calcium chloride, as it is demonstrated by stirring with heptane. The reduction product is not loosened from the support by the heptane test.

25 g. of a granulated portion containing 0.6 g. of TiCl$_3$ are intimately mixed with 25 g. of polypropylene granules on which are adsorbed 2.65 g. of aluminum triethyl. The mix is transferred into a 2-liter autoclave, and a polymerization of propylene is carried out for seven hours at 75° C. and at 5 atmospheres, as described in Example 1. 260 g. of polymer are obtained, excluding the starting supports. After washing with water and methanol, and drying, the polymer has the following characteristics:

[$\eta$] (determined in tetralin at 135° C.)=2.4;
Residue after extraction with boiling heptane=81%;
Flexural rigidity=8800 kg./cm.

Example 5

7 cc. of titanium tetrachloride are introduced into the reactor defined in Example 4. A stainless steel perforated cylinder of a very fine mesh is then introduced and suspended in the vertical reactor in such a way that there is no contact with the liquid titanium tetrachloride. This cylinder contains 6 g. of dry CaCl$_2$ granules which have been passed through a 100 mesh/cm.$^2$ screen and are the oversize from a 200 mesh/cm.$^2$ screen, on which are dispersed 0.3 g. of aluminum powder. The reactor is heated to 300° C. for sixteen hours. The bulk product is then discharged and treated as described in Example 1.

A screen test is made and two sizes are collected; a granulated portion consisting of 63 g. of granules containing 4.72% of titanium trichloride, and 2.10 g. of a powdered portion, containing 17.5% of TiCl$_3$. 90% of TiCl$_3$ is supported on calcium chloride. The granules which are colored a red-dark violet shade, do not fade when stirred with heptane.

25.5 g. of the granulated portion containing 1.2 g. of TiCl$_3$ are intimately mixed with 25 g. of polypropylene on which are adsorbed 1.15 g. of beryllium diethyl and 4.53 g. of aluminum triethyl-diethyl ether complex. The mix is transferred into an autoclave and a polymerization of propylene is carried out for seven hours at 75° C., and at 5 atmospheres, as described in Example 1.

405 g. of polymer are obtained, not counting the starting support material. After washing with water and methanol and drying the polymer has the following characteristics: [$\eta$] (determined in tetralin at 135° C.) =2.4; residue of the extraction with boiling heptane=92%; flexural rigidity=13,200 kg./cm.$^2$.

Many variations and modifications can of course be made without departing from the scope of the present invention.

Having thus described the present invention, what it is desired to secure and claim by Letters Patent is:

1. In a process for preparing a supported catalyst for the stereospecific vapor phase polymerization of alpha-olefins, said catalyst comprising (1) a solid halide of a transition metal belonging to one of the groups IV to VIII inclusive of the Mendeléeff Periodic Table in which halide the metal has a valence state lower than its maximum valence state and (2) at least one organometallic compound of a metal belonging to one of groups II and III of said Periodic Table, wherein said transition metal halide (I) is prepared by reduction of the corresponding maximum valence liquid transition metal per halide with finely divided aluminum and the reduction product is firmly anchored to an inorganic support which is inert to the catalyst and soluble in a substance selected from the group consisting of water and washing solutions of the polymer comprising ketones, glycols, alcohols and aqueous solutions of ketones, glycols and alcohols, the improvement which comprises intimately admixing the inert support, in finely divided condition, with finely divided aluminum, in a ratio from 100:1 to 400:1, to thereby coat the support with aluminum; impregnating the aluminum-coated support with a liquid perhalide of the group IV to VIII metal in which the metal has its maximum valence in an amount which is in excess of the theoretical amount required to react with the aluminum but does not exceed the amount capable of being absorbed on the support; heating the mixture of the liquid metal perhalide, aluminum and support at a temperature between 150° C. and 400° C.; and removing the excess liquid metal perhalide, the reduction of the perhalide being accomplished in the absence of a diluent.

2. A process as claimed in claim 1, wherein the finely divided inert support and finely divided aluminum are admixed in a ratio of about 200:1.

3. A process as claimed in claim 1, wherein said inorganic support is soluble in washing solutions for the alpha-olefin polymer.

4. A process according to claim 1, wherein said inorganic support is soluble in water.

5. A process according to claim 1, wherein said excess perhalide is removed by at least one method selected from the group consisting of washing and vacuum drying.

6. A process as claimed in claim 1, wherein the amount of transition metal perhalide is such that the ratio by weight of transition metal perhalide to aluminum is within the range from 21:1 to 200:1.

7. A process as claimed in claim 1, wherein the inorganic support is calcium chloride.

8. A process as claimed in claim 1, wherein the reduction temperature is between 200° and 300° C.

9. A process as claimed in claim 1, wherein the ratio by weight of transition metal perhalide to aluminum is between 40:1 and 100:1.

10. A process as claimed in claim 1, wherein the reduction is carried out in a rotary reactor comprising a horizontally positioned pipe flanged on the ends, and containing a mix comprising an inorganic support and aluminum, which support is impregnated with titanium tetrachloride.

11. A process as claimed in claim 1, wherein the reduction is carried out in a vertically positioned reactor containing a mix comprising an inorganic support and aluminum powder, said mix being intimately contacted with vapor phase titanium tetrachloride which is fed into the reactor and through the mix.

12. A process for the sterospecific polymerization of alpha-olefins wherein the polymerization is carried out in presence of a catalyst prepared according to the process of claim 1.

13. A catalyst for the stereospecific polymerization of alpha-olefins comprising (1) a solid halide of a transition metal belonging to one of the groups IV to VIII inclusive of the Mendeléeff Periodic Table in which the metal has a lower valence than its maximum valence and which halide is firmly anchored to an inert inorganic support and (2) at least one organometallic compound of a metal belonging to one of the groups II and III of said Periodic Table deposited on a support, said catalyst being prepared by the process of claim 1.

14. A catalyst according to claim 13, wherein the support for the transition metal halide of (1) and the support for the organometallic compound of (2) are the same.

15. A catalyst according to claim 13, wherein the support for the transition metal halide of (1) and the support of the organometallic compound of (2) are different from each other.

16. A catalyst as defined in claim 13, wherein the molecular ratio of the organometallic compound to the transition metal halide is from 1:1 to 10:1.

17. A catalyst according to claim 16, wherein said molecular ratio is from 2:1 to 7:1.

18. A catalyst as claimed in claim 13, containing (1) titanium trichloride, prepared by reduction of titanium tetrachloride with powdered aluminum, and (2) an organoaluminum compound deposited on a support selected from the group consisting of inorganic supports and polypropylene.

19. A catalyst as claimed in claim 13, wherein the organo-aluminum compound is aluminum triethyl.

20. A catalyst as claimed in claim 13, in which the solid transition metal halide (1) is titanium trichloride prepared by the reduction of titanium tetrachloride with powdered aluminum, the organometallic component (2) is organo beryllium compound and an organo aluminum ether complex, and both (1) and (2) are adsorbed on the same inorganic support.

21. A catalyst as claimed in claim 20 wherein said organometallic compounds are adsorbed on polypropylene.

22. A catalyst as claimed in claim 20, wherein the organo aluminum ether complex is aluminum triethyldiethyl ether.

23. A catalyst as claimed in claim 20, wherein the organo beryllium compound is beryllium diethyl.

24. A process for the sterospecific polymerization of alpha-olefins wherein the polymerization is carried out in presence of a catalyst as defined in claim 13.

References Cited by the Examiner

UNITED STATES PATENTS

| | | | |
|---|---|---|---|
| 2,981,725 | 4/1961 | Luft et al. | 260—94.9 XR |
| 2,994,691 | 8/1961 | Gates | 260—94.9 |
| 2,996,459 | 8/1961 | Andersen et al. | 260—94.9 |
| 3,001,951 | 9/1961 | Tornqvist et al. | 260—94.9 |
| 3,010,787 | 11/1961 | Tornqvist | 260—94.9 |

FOREIGN PATENTS 809,717   3/1959   Great Britain.

OTHER REFERENCES

"Linear and Stereoregular Addition Polymers," Gaylord and Mark, Interscience Publishers (1959), (page 157).

JOSEPH L. SCHOFER, *Primary Examiner.*